United States Patent
Matsui et al.

(10) Patent No.: US 7,801,509 B2
(45) Date of Patent: Sep. 21, 2010

(54) COMPUTER-READABLE RECORDING MEDIUM STORING DATA COMMUNICATION PROGRAM, DATA COMMUNICATION METHOD, AND MOBILE TERMINAL

(75) Inventors: Kazuki Matsui, Kawasaki (JP); Hideto Kihara, Kawasaki (JP); Soichi Nishiyama, Kawasaki (JP); Yasuhiko Awamoto, Yokohama (JP); Hiroshi Kokubo, Yokohama (JP); Chizu Tuge, Kawasaki (JP); Yoshiyuki Ito, Kawasaki (JP); Norie Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/588,935

(22) Filed: Oct. 27, 2006

(65) Prior Publication Data

US 2007/0242646 A1 Oct. 18, 2007

(30) Foreign Application Priority Data

Apr. 14, 2006 (JP) ............................. 2006-111484

(51) Int. Cl.
*H04M 1/66* (2006.01)
*H04W 4/00* (2009.01)

(52) U.S. Cl. ..................... 455/411; 455/414.1; 455/421; 370/338; 370/412

(58) Field of Classification Search ................ 370/338, 370/412; 455/421, 411, 414.1
See application file for complete search history.

(56) References Cited

U.S. PATENT DOCUMENTS

| | | | |
|---|---|---|---|
| 6,138,031 A * | 10/2000 | Sillanpaa et al. ............ 455/512 |
| 7,177,628 B2 * | 2/2007 | Sommers et al. ......... 455/414.1 |
| 2001/0055280 A1 * | 12/2001 | Honda et al. ................ 370/278 |
| 2002/0059176 A1 * | 5/2002 | Fujisawa ........................ 707/1 |
| 2002/0118388 A1 * | 8/2002 | Honda et al. ............... 358/1.15 |
| 2004/0107236 A1 * | 6/2004 | Nakagawa et al. .......... 709/200 |
| 2004/0243712 A1 * | 12/2004 | Sakai et al. .................. 709/227 |
| 2005/0070251 A1 * | 3/2005 | Satake et al. ................ 455/411 |
| 2005/0105482 A1 * | 5/2005 | Kobayashi et al. ....... 370/310.1 |
| 2005/0169290 A1 * | 8/2005 | Sumita ....................... 370/412 |
| 2007/0071179 A1 * | 3/2007 | Fukazawa et al. ........ 379/32.01 |

FOREIGN PATENT DOCUMENTS

| | | |
|---|---|---|
| EP | 1536613 A | 6/2005 |
| GB | 2366134 A | 1/2002 |
| JP | 2003-032751 | 1/2003 |

* cited by examiner

*Primary Examiner*—Dwayne Bost
*Assistant Examiner*—Chhean Thao
(74) *Attorney, Agent, or Firm*—Greer, Burns & Crain, Ltd.

(57) ABSTRACT

A computer-readable recording medium storing a data communication program capable of transmitting desired data quickly. The mobile terminal (computer) has the following functions: A data accumulating section accumulates accumulation data to be uploaded to a server 7. A transmission data-generating section generates transmission data that is to be transmitted to the server for making the inquiry and has the accumulation data added thereto. A determination section determines whether or not the mobile terminal is in a state in which the transmission data can be transmitted to the server. A communication scheduler permits a data communication section to transmit the transmission data to the server based on the result of determination of the determination section. The data communication section transmits the transmission data to the server in response to permission of the communication scheduler.

6 Claims, 14 Drawing Sheets

300 BUSINESS OPERATION DATA

【HTTP HEADER INFORMATION】
POST http://localhost/m2es/servlet;jsessionid=F799B320CC0 HTTP/1.0
Content-Length: 78
User-Agent: DCM/2.0 D_INET_CLIENT(c100;TJ)
Host: localhost
Proxy-Connection: Keep-Alive
Pragma: no-cache
Cookie: JSESSIONID=7F180E420CC0

【HTTP BODY INFORMATION】
Input1=Goods&input2=Region&input3···

FIG. 7

400b MANAGEMENT DATA

【HTTP HEADER INFORMATION】
POST http://localhost/m2es/servlet;jsessionid=F799B320CC0 HTTP/1.0
Content-Length: 78
User-Agent: DCM/2.0 D_INET_CLIENT(c100;TJ)
Host: localhost
Proxy-Connection: Keep-Alive
Pragma: no-cache
Cookie: JSESSIONID=7F180E420CC0

【HTTP BODY INFORMATION】
_lg=1134110843515,100,800,ICA011,1.0.0%0A
...

FIG. 8

203a DATA TABLE

| TERMINAL ID | PARAMETER | FLAG | REQUESTED VALUE | CURRENT VALUE |
|---|---|---|---|---|
| 123456789 | mode | 1 | Urgent | Normal |
| ... | ... | ... | ... | ... |

FIG. 10

COMPUTER-READABLE RECORDING MEDIUM STORING DATA COMMUNICATION PROGRAM, DATA COMMUNICATION METHOD, AND MOBILE TERMINAL

CROSS-REFERENCE TO RELATED APPLICATIONS

This application is based upon and claims the benefits of priority from the prior Japanese Patent Application No. 2006-111484 filed Apr. 14, 2006, the entire contents of which are incorporated herein by reference.

BACKGROUND OF THE INVENTION

1. Field of the Invention

This invention relates to a computer-readable recording medium storing a data communication program, a data communication method, and a mobile terminal, and more particularly to a computer-readable recording medium storing a data communication program for causing a mobile terminal having computer capabilities to perform data communication with a predetermined server, a data communication method, and a mobile terminal having computer capabilities to perform data communication with a predetermined server.

2. Description of the Related Art

In a business application used by a mobile terminal, business operation data communication is generally carried out for transmitting various data, such as data of a daily business report, an operation log, and so forth, to a server (business operation server).

Further, to cope with the loss of mobile terminals, and reduce maintenance and operation costs of the same, there is a demand for the capabilities of remote maintenance and operation management of the mobile terminals. To meet the demand, communication for operation management (e.g. transmission of a log and reception of a push message by polling, etc.; hereinafter referred to as "the management data communication") is generally carried out separately from the business operation data communication.

Now, assuming that a mobile terminal is outside a service area (offline), for example, if a sales representative desires to transmit data of a daily business report or the like to the business operation server, or if it is desired to transmit data of inspection of collected blood from a place outside the service area, such as a hospital, a warning message "Outside Service Area" or the like appears on a display screen of the mobile terminal to inhibit the data from being transmitted. This hinders execution of business operations.

Further, for example, when a user has lost his mobile terminal, the business operation server sometimes desires to quickly obtain the operation log of the user to thereby investigate whether or not secret information stored in the mobile terminal has been referred to. In such a case as well, the offline state of the mobile terminal hinders execution of business operations.

In the management data communication as well, there are brought about similar problems, such as the incapability of operation management.

To overcome the above problems, there has been proposed a method of automatically resuming data communication when the mobile terminal is restored from a state incapable of transmitting data. One known example of the method is that the mobile terminal detects that it has returned into a service area from outside the same, and automatically inquires of the server as to held mails (see e.g. Japanese Laid-Open Patent Publication (Kokai) No. 2003-32751).

As described above, when the mobile terminal is restored from the state incapable of transmitting data, it is necessary to transmit data which should be transmitted, to the server as early as possible.

SUMMARY OF THE INVENTION

The present invention has been made in view of these problems, and an object thereof is to provide a computer-readable recording medium storing a data communication program capable of transmitting desired data quickly, and a data communication method and a mobile terminal which are capable of transmitting desired data quickly.

To attain the above object, in a first aspect of the present invention, there is provided a computer-readable recording medium storing a data communication program that periodically performs communication for inquiring of a predetermined server as to whether or not there exists data of which the server should notify the mobile terminal, and receiving a signal transmitted from the server in response to the inquiry, by using a mobile terminal having computer capabilities. The data communication program stored in the computer-readable recording medium is characterized by causing a computer to function as data accumulating means for accumulating accumulation data to be uploaded to the server, transmission data-generating means for causing transmission data that is to be transmitted to the server for making the inquiry to contain the accumulation data, determination means for determining whether or not the mobile terminal is in a state in which the transmission data can be transmitted to the server, communication scheduler for permitting the transmission data to be transmitted to the server based on a result of determination of the determination means, and data communication means for transmitting the transmission data to the server in response to permission of the communication scheduler.

To attain the above object, in a second aspect of the present invention, there is provided a method of data communication including periodically performing communication for inquiring of a predetermined server as to whether or not there exists data of which the server should notify the mobile terminal, and receiving a signal transmitted from the server in response to the inquiry, by using a mobile terminal having computer capabilities. The method is characterized by comprising the steps of accumulating accumulation data to be uploaded to the server, causing transmission data that is to be transmitted to the server for making the inquiry to contain the accumulation data, determining whether or not the mobile terminal is in a state in which the transmission data can be transmitted to the server, and transmitting the transmission data to the server when the transmission data can be transmitted to the server.

To attain the above object, in a third aspect of the present invention, there is provided a mobile terminal that has computer functions, and periodically performs communication for inquiring of a predetermined server as to whether or not there exists data of which the server should notify the mobile terminal, and receives a signal transmitted from the server in response to the inquiry. The mobile terminal is characterized by comprising data accumulating means for accumulating accumulation data to be uploaded to the server, transmission data-generating means for causing transmission data that is to be transmitted to the server for making the inquiry to contain the accumulation data, determination means for determining whether or not the mobile terminal is in a state in which the transmission data can be transmitted to the server, a communication scheduler for permitting the transmission data to be transmitted to the server based on a result of determination of the determination means, and data communication means for transmitting the transmission data to the server in response to permission of the communication scheduler.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 is a diagram showing an example of business operation data;

FIG. 8 is a diagram showing an example of the management data;

FIG. 10 is a diagram showing an example of the data structure of a data table;

DESCRIPTION OF THE PREFERRED EMBODIMENTS

The invention will now be described in detail with reference to the drawings showing a preferred embodiment thereof.

First, a description will be given of the concept of the invention applied to the preferred embodiment, and then of details of the embodiment.

Figure 1:
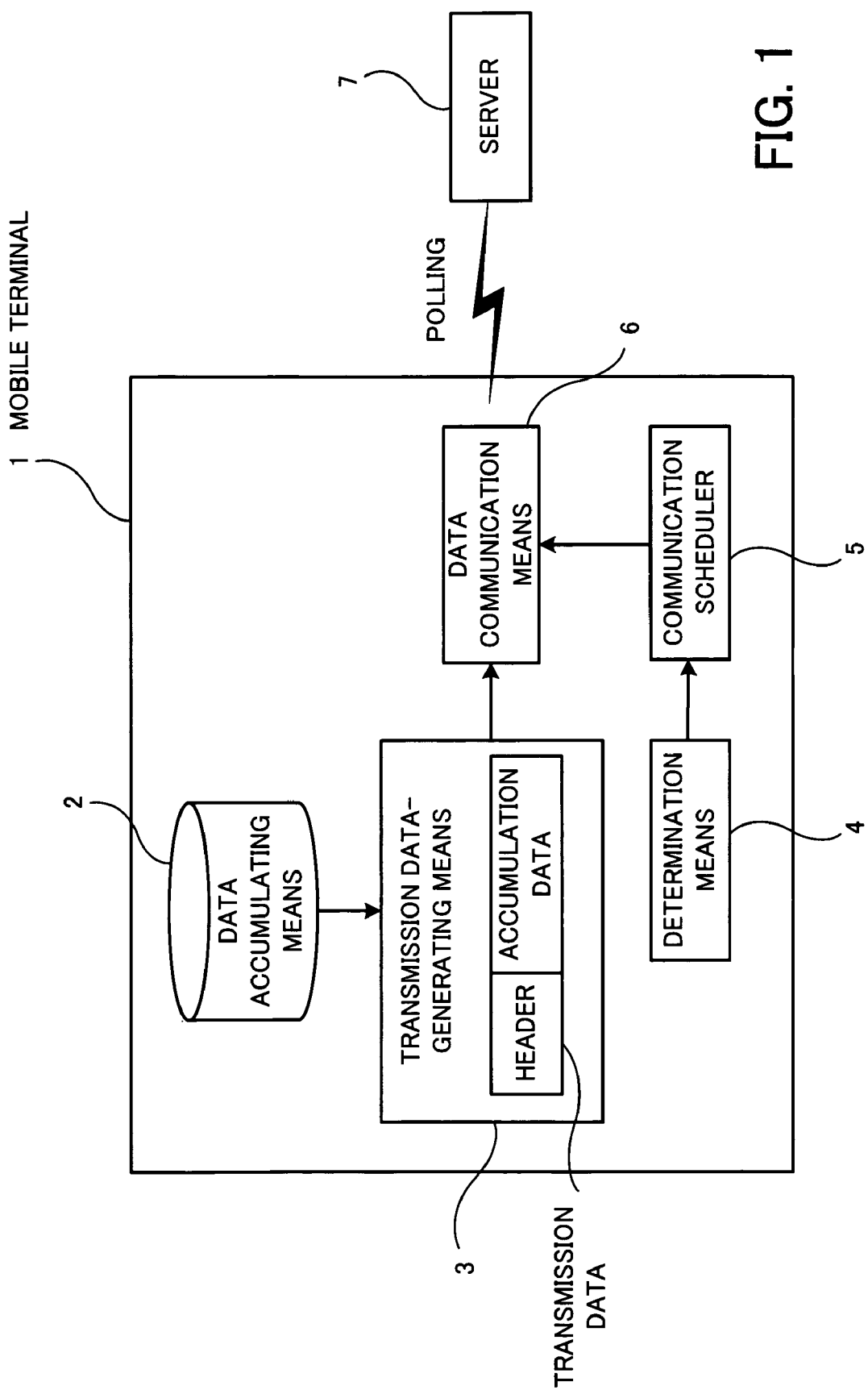
FIG. 1 is a diagram showing the concept of the invention applied to a preferred embodiment thereof.

FIG. 1 is a schematic diagram of the concept of the present invention applied to the preferred embodiment thereof.

A mobile terminal (computer) 1 shown in FIG. 1 can be caused to function as a data accumulating means 2, a transmission data-generating means 3, a determination means 4, a communication scheduler 5, and a data communication means 6.

The mobile terminal 1 periodically performs communication (polling communication) for inquiring of a server 7 as to whether or not there exists data of which the server 7 should notify the mobile terminal 1, and receiving a signal transmitted from the server 7 in response to the inquiry. This communication concerns remote maintenance, for example. In responding to the inquiry, the server 7 can transmit data including various kinds of commands to the mobile terminal 1.

The data accumulating means 2 accumulates accumulation data to be uploaded to the server 7. Here, although the data to be uploaded is not particularly limited, it may include e.g. business operation data and data input by a user.

The transmission data-generating means 3 causes transmission data that is to be transmitted to the server 7 for making the above inquiry to contain the accumulation data. More specifically, the transmission data-generating means 3 determines whether or not a packet of the transmission data has an available area, and causes the transmission data to contain accumulation data such that the amount of the transmission data is within a range not exceeding the limit of the amount of the packet (within the range of the amount of transmission data which is guaranteed to be transmitted at a time).

The determination means 4 determines whether or not the mobile terminal 1 is in a state in which it can transmit the transmission data to the server 7. It should be noted that the above determination is carried out by the determination means 4 whenever transmission data is to be transmitted to the server 7.

The communication scheduler 5 permits the data communication means 6 to send the transmission data to the server 7 based on the result of the determination of the determination means 4.

The data communication means 6 sends the transmission data to the server 7 in response to the permission of the communication scheduler 5.

According to the data communication program described above, the data accumulating means 2 accumulates accumulation data to be uploaded to the server 7, and the transmission data-generating means 3 causes transmission data that is to be transmitted to the server 7 for making the above inquiry to contain the accumulation data. Then, the determination means 4 determines whether or not the transmission data can be transmitted to the server 7. After that, when the communication scheduler 5 permits the data communication means 6 to send the transmission data to the server 7 based on the result of the determination of the determination means 4, the data communication means 6 sends the transmission data to the server 7.

Hereinafter, a detailed description will be given of the embodiment of the present invention.

Figure 2:
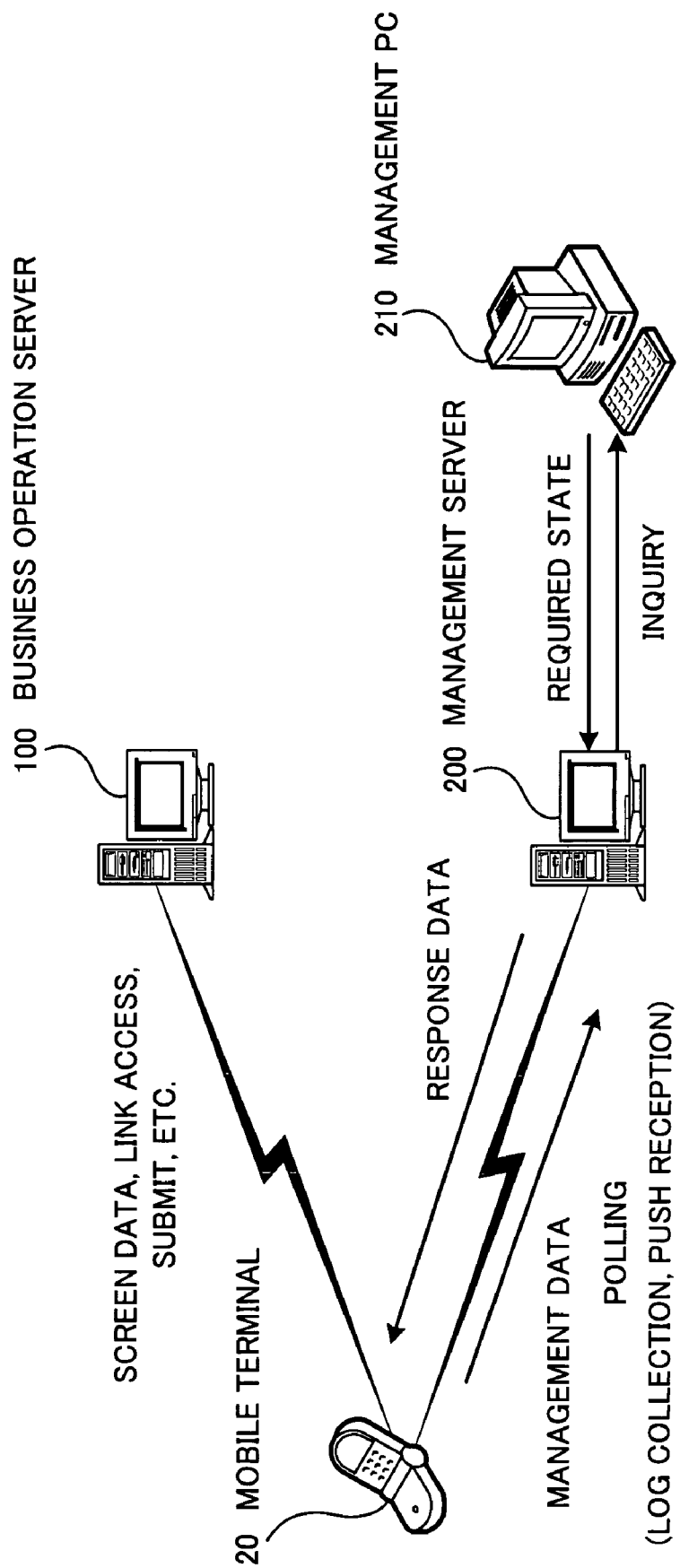
FIG. 2 is a block diagram of a data communication system according to the preferred embodiment.

FIG. 2 is a block diagram of a data communication system according to the present embodiment.

In the data communication system, a mobile terminal 20 is connected to a business operation server 100 that manages business operations carried out by the mobile terminal 20, and a management server 200 that performs maintenance of the mobile terminal 20 e.g. by managing a state of the connection between the mobile terminal 20 and the business operation server 100, via a communication network, not shown. Further, similarly, the management server 200 is also connected to a management PC (Personal Computer) 210 via the communication network.

The business operation server 100 performs transmission and reception of business operation data concerning business operations to and from the mobile terminal 20. More specifically, the business operation server 100 has the functions of transmitting a display screen to be displayed on a monitor (referred to hereinafter) of the mobile terminal 20 to the mobile terminal 20, receiving various requests, such as a link access request, from the mobile terminal 20, sending responses to the requests to the mobile terminal 20, and receiving business reports from the mobile terminal 20 to store the contents of the reports in a storage section of the business operation server 100.

The mobile terminal 20 transmits to the management server 200 management data (transmission data) for checking whether or not there exists data of which the management server 200 should notify the mobile terminal 20 (whether or not there exists a transmission request or a processing request). Further, the mobile terminal 20 receives management data (hereinafter referred to as "response data") transmitted from the management server 200 in response to the management data. Then, the mobile terminal 20 performs processing based on the received response data. The mobile terminal 20 periodically performs transmission and reception of management data (hereinafter referred to as "the polling communication") to and from the management server 200.

Further, when transmitting management data to the management server 200 in response to the response data, the mobile terminal 20 adds reception confirming data to the management data.

Further, the mobile terminal 20 is capable of communicating with another mobile terminal via a mail server, not shown, a telephone communication network, not shown, and so forth. The mobile terminal 20 includes e.g. a cellular phone, a PHS (Personal Handyphone System), and a PDA (Personal Digital Assistant), although not particularly limited.

The management server 200 operates when it receives the management data, to add the reception confirming data for confirming the reception of the management data, to the response data.

Further, upon reception of the management data, the management server 200 compares the current state of the mobile terminal 20 stored in the management server 200, and a demanded state (referred to hereinafter) of the mobile terminal 20, obtained from the management PC 210, and if the current state and the demanded state are different from each other, the management server 200 transmits response data containing an instruction for changing the current state of the mobile terminal 20 into the demanded state thereof, to the mobile terminal 20. The mobile terminal 20 performs processing for changing the current state of the mobile terminal 20 into the demanded state thereof according to the response data.

The management PC 210 inquires of the management server 200 about the current state of the mobile terminal 20 to thereby obtain the current state. When the current state of the mobile terminal 20 is different from the demanded state thereof, the management PC 210 transmits to the management server 200 the demanded state of the mobile terminal 20 into which the current state thereof should be changed. The management PC 210 is capable of selecting between a state of normal transmission and a state of forced transmission, as the demanded state. This selection can be set e.g. by an administrator.

When the state of the normal transmission has been selected as the demanded state of the mobile terminal 20, which has been added to the received response data, the mobile terminal 20 performs the normal transmission (normal communication). On the other hand, when the state of the forced transmission has been selected as the demanded state of the mobile terminal 20, the mobile terminal 20 performs the forced transmission (forced communication). Operations of the mobile terminal 20 in the state of the normal transmission and in the state of the forced transmission will be described in details hereinafter.

Figure 3:
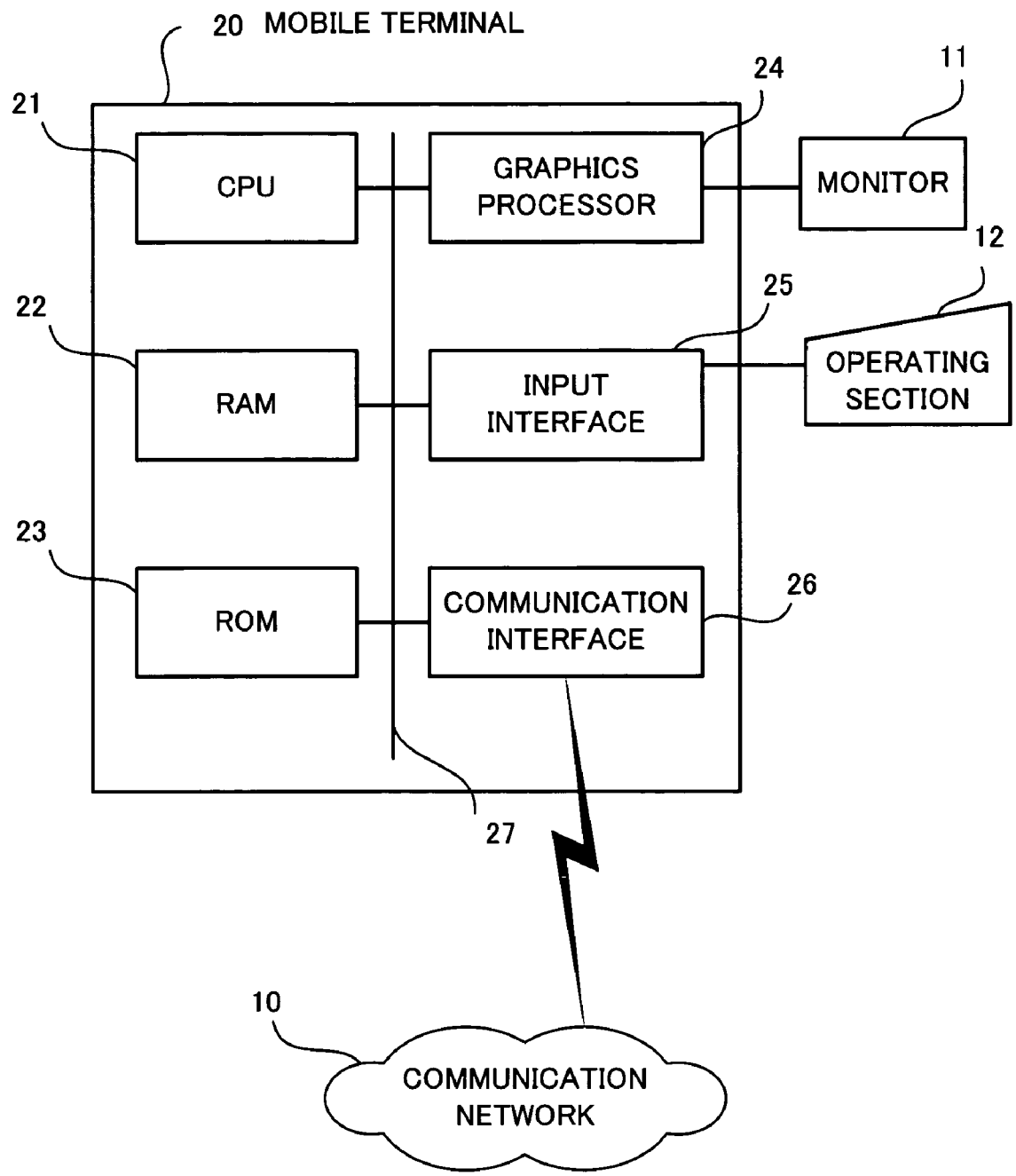
FIG. 3 is a diagram showing an example of the hardware configuration of a mobile terminal.

FIG. 3 is a diagram showing an example of the hardware configuration of the mobile terminal.

The overall operation of the mobile terminal 20 is controlled by a CPU (Central Processing Unit) 21. A RAM (Random Access Memory) 22, a ROM (Read Only Memory) 23, a graphics processor 24, an input interface 25, and a communication interface 26 are connected to the CPU 21 via a bus 27.

The RAM 22 temporarily stores at least part of the program of an OS (Operating System) and application programs executed by the CPU 21. Further, the RAM 22 stores various data required in processing by the CPU 21. The ROM 23 stores the OS and the application programs. Further, the ROM 23 stores program files.

The graphics processor 24 is connected to a monitor 11. The graphics processor 24 displays an image on the screen of the monitor 11 in response to commands from the CPU 21. The input interface 25 has an operating section 12 including a plurality of keys (number keys, etc.) connected thereto. The input interface 25 sends signals received from the operating section 12 to the CPU 21 via the bus 27.

The communication interface 26 can be connected to a communication network 10. The communication interface 26 performs transmission and reception of data to and from the business operation server 100, the management server 200, and other mobile terminal equipment over the communication network 10.

The hardware configuration described above can implement the processing capabilities of the present embodiment. Although FIG. 3 shows the hardware configuration of the mobile terminal 20, by way of examples, the business operation server 100 and the management server 200 can also be implemented by the same hardware configuration. In this case, each of the business operation server 100 and the management server 200 further includes a hard disk drive (HDD), and so forth, and an operating section 12 thereof has a keyboard and a mouse. To carry out communication of management data by the system having the hardware configuration described above, the mobile terminal 20 is provided with the following functions.

Figure 4:
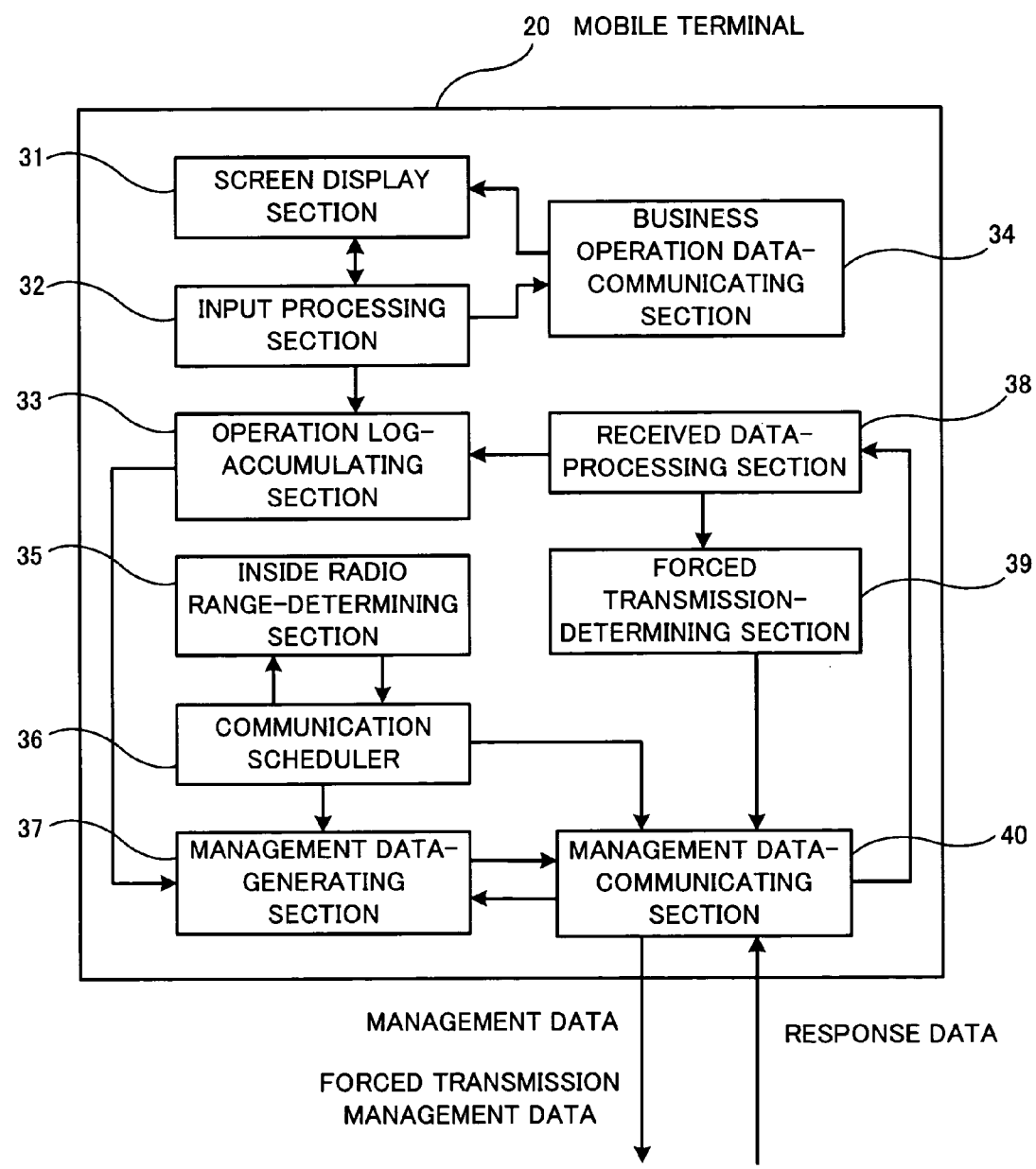
FIG. 4 is a functional block diagram of the mobile terminal.

FIG. 4 is a functional block diagram of the mobile terminal.

The mobile terminal 20 is comprised of a screen display section 31, an input processing section 32, an operation log-accumulating section 33, a business operation data-communicating section 34, an inside radio range-determining section 35, a communication scheduler 36, a management data-generating section 37, a received data-processing section 38, a forced transmission-determining section 39, and a management data-communicating section 40.

The screen display section 31 displays various screens on the monitor 11 in response to operation of the operating section 12 by the user. For example, when the screen display section 31 is instructed by the user operating the operating section 12, to call out a mobile screen for business operations, not shown, which is used by the user for reporting information on business operations, the screen display section 31 reads screen-defining data that defines the mobile screen for business operations to thereby display the mobile screen on the monitor 11.

The input processing section 32 produces a terminal operation log (transmission awaiting data) including log data generated by sequentially arranging a screen ID, a URL (Uniform Resource Locator), and a time, which were stored when the operating section 12 was operated by the user.

The operation log-accumulating section 33 sequentially accumulates terminal operation logs produced by the input processing section 32.

The business operation data-communicating section 34 performs transmission and reception of various data, such as screen-defining data, to and from the business operation server 100 in desired timing. For example, upon reception of business operation data from the input processing section 32, the business operation data-communicating section 34 transmits the business operation data to the business operation server 100. Further, upon reception of screen-defining data from the business operation server 100, the business operation data-communicating section 34 sends the data to the screen display section 31.

The inside radio range-determining section 35 determines as to each of the business operation server 100 and the management server 200 whether or not the mobile terminal 20 is within a radio range in which data can be transmitted thereto and received therefrom.

The communication scheduler 36 sends a request for generating management data (management data-generating request) to the management data-generating section 37 in timing in which the polling communication is performed. After that, when notified by the management data-generating section 37 that generation of the management data has been completed, the communication scheduler 36 confirms whether or not the mobile terminal 20 is within the above radio range (communication range) by referring to the results of determination of the inside radio range-determining section 35. When it is confirmed that the mobile terminal 20 is within the above radio range, the communication scheduler 36 sends to the management data-communicating section 40 a transmission enable notification for enabling the management data-communicating section 40 to send data (management data or management data for forced transmission, referred to hereinafter) waiting for communication in the management data-communicating section 40, to the management server 200.

The management data-generating section 37 operates when it receives the management data-generating request from the communication scheduler 36, to generate management data containing terminal operation logs accumulated in the operation log-accumulating section 33, and sends the management data to the management data-communicating section 40, as well as transmits a notification that generation of the management data has been completed to the communication scheduler 36. Further, the management data-generating section 37 operates when it receives an instruction for producing management data for forced transmission, described hereinafter, from the management data-communicating section 40, to generate the management data for forced transmission (hereinafter referred to as "the forced transmission management data") containing terminal operation logs and the reception confirming data, referred to hereinafter, and passes the data to the management data-communicating section 40, as well as sends a notification that generation of the management data has been completed to the communication scheduler 36. It should be noted that the management data-generating request from the communication scheduler 36 is ignored after there has been received the instruction for producing the forced transmission management data.

The received data-processing section 38 and the forced transmission-determining section 39 are mainly provided for carrying out the forced transmission.

The received data-processing section 38 operates when it receives response data from the management data-communicating section 40, to confirm whether or not the response data includes reception confirming data. When the response data includes reception confirming data, the received data-processing section 38 deletes the terminal operation logs added to the immediately preceding management data and stored in the operation log-accumulating section 33.

Further, the received data-processing section 38 passes the response data to the forced transmission-determining section 39.

The forced transmission-determining section 39 determines whether or not the forced transmission is to be performed, based on the response data. When the forced transmission-determining section 39 has determined that the forced transmission is to be performed, it transmits a forced transmission request for requesting generation of the forced transmission management data, to the management data-communicating section 40.

The management data-communicating section 40 operates when it receives the management data or the forced transmission management data from the management data-generating section 37, to wait for permission of communication, and then upon reception of the permission of communication, to transmit the management data or the forced transmission management data to the management server 200. Further, the management data-communicating section 40 operates when it receives the forced transmission request from the forced transmission-determining section 39, to send the instruction for producing the forced transmission management data to the management data-generating section 37. Further, upon reception of a request for canceling the forced transmission (forced transmission-canceling request) from the forced transmission-determining section 39, the management data-communicating section 40 sends an instruction for canceling the production of the forced transmission management data to the management data-generating section 37.

Further, when the management data-communicating section 40 receives response data from the management server 200, it sends the response data to the received data-processing section 38.

Next, a description will be given of the terminal operation log stored in the operation log-accumulating section 33.

Figure 5:
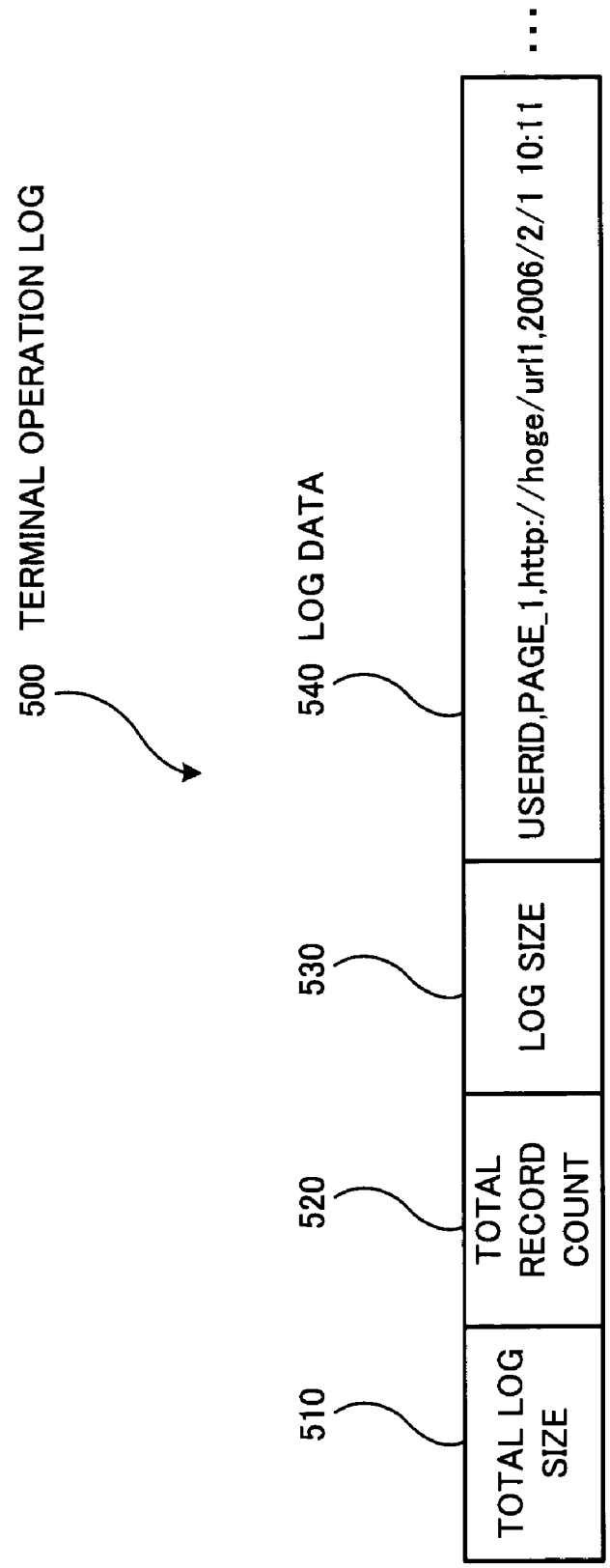
FIG. 5 is a diagram showing a terminal operation log.

FIG. 5 is a diagram showing the terminal operation log.

The terminal operation log 500 is comprised of a total log size 510, a total record count 520, a log size 530, and log data 540, which are arranged in the mentioned order. The log size 530 and the log data 540 form one record. In the log data 540, there are sequentially stored, for example, a screen ID for identifying the title of a display screen accessed by the user and displayed on the screen display section 31, a URL that is selected by the user on the display screen identified by the screen ID and displayed by the screen display section 31, a log recording time, and so forth. In the illustrated example, the log data 540 sequentially stores the screen ID "PAGE__1", the URL "http://hoge/url1", and the log recording time "2006/2/1".

Next, a description will be given of the data structure of the management data transmitted to the management server 200 in the state of the normal communication (when performing the normal communication).

Figure 6:
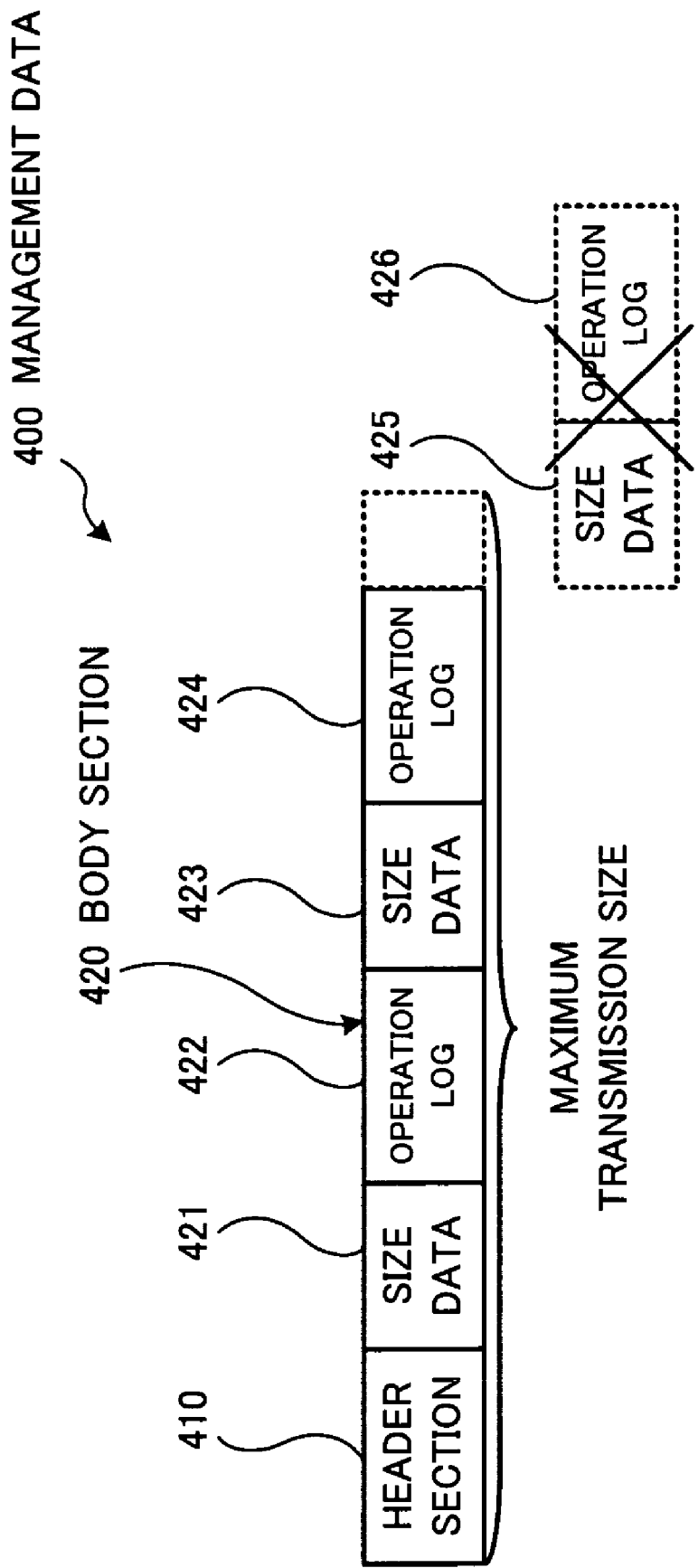
FIG. 6 is a diagram showing the data structure of management data.

FIG. 6 is a diagram showing the data structure of the management data.

The management data 400 is comprised of a header section 410 and a body section 420.

The body section 420 stores data having the length of contents (content length) written in the header section 410. In the illustrated example, the body section 420 stores size data 421 indicative of the size (amount of data) of an operation log 422, the operation log 422, size data 423 indicative of the size of an operation log 424, and the operation log 424, in the mentioned order from the left side.

It is preferable to use a maximum transmission size defined by the standards for the maximum transmission size as the sum of the size of the header section 410 and that of the body section 420. For example, assuming that the mobile terminal 20 performs management data communication with the management server 200 via a wireless LAN, an MTU (Maximum Transmission Unit), which is the maximum transmission size, is approximately 1500 bytes.

In the state of the normal communication, the management data-generating section 37 generates the maximum amount of the management data 400 within the range of the maximum transmission size defined in advance. More specifically, as shown in FIG. 6, after storing the size data 421, the operation log 422, the size data 423, and the operation log 424, if the packet of the management data 400 has an available area, the management data-generating section 37 attempts to further store a size data 425 and an operation log 426. If the size data 425 and the operation log 426 cannot be stored, the management data-generating section 37 transmits them during the next polling communication.

On the other hand, in the state of the forced communication (when performing the forced communication), the management data-generating section 37 passes all the operation logs stored in the operation log-accumulating section 33 to the management data-communicating section 40 as forced transmission management data, irrespective of the maximum transmission size mentioned above.

Next, a description will be given of an example of data contained in the business operation data and the management data.

FIG. 7 is a diagram showing an example of the business operation data.

The business operation data 300 contains HTTP (HyperText Transfer Protocol) header information and HTTP body information. The HTTP header information contains the information of an URL of a transmission destination, a content length, a user agent for use in determination of the type of the mobile terminal 20, a host name, a proxy connection which sets a connection mode between the mobile terminal 20 and the business operation server 100, Pragma, Cookie, etc. The HTTP body information contains e.g. information input by the user to the input processing section 32.

FIG. 8 is a diagram showing an example of the management data.

The management data 400b contains HTTP header information and HTTP body information. Similarly to the business operation data 300, the management data 400b contains the information of an URL of a transmission destination and so forth. The HTTP body information contains the information e.g. of the above-described size data and operation logs.

Next, a description will be given of the functions of the management server 200.

Figure 9:
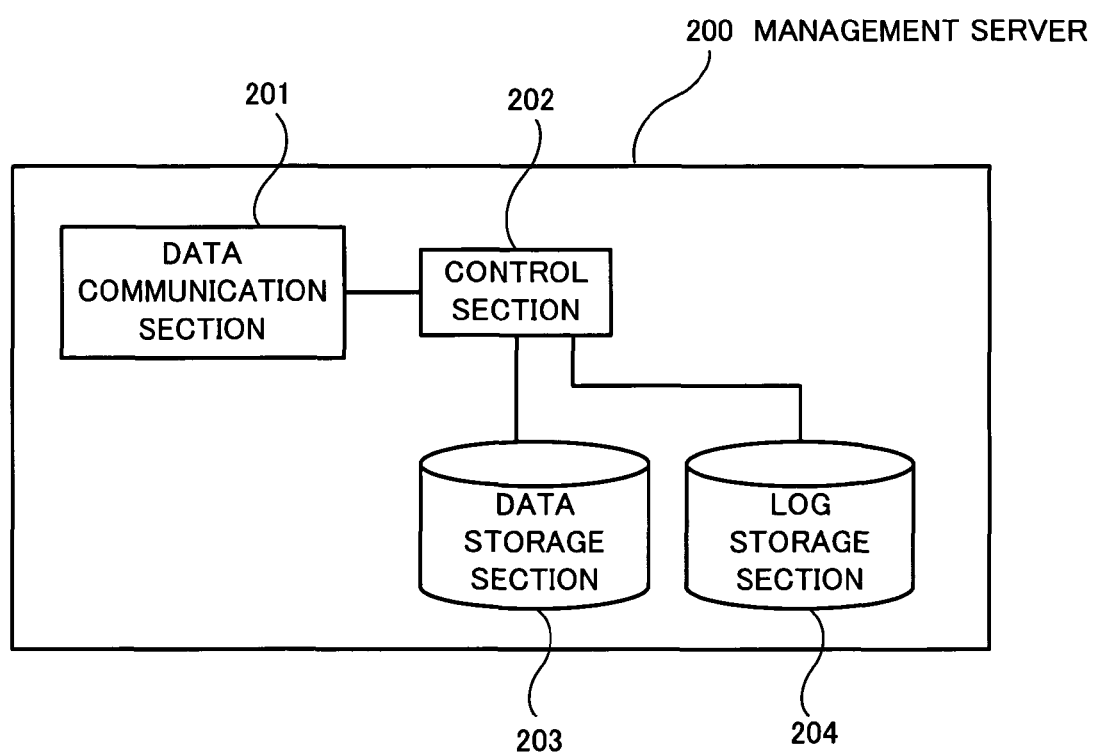
FIG. 9 is a functional block diagram of a management server.

FIG. 9 is a functional block diagram of the management server.

The management server 200 is comprised of a data communication section 201, a control section 202, a data storage section 203, and a log storage section 204.

The data communication section 201 performs transmission and reception of data to and from the mobile terminal 20 and the management PC 210.

The control section 202 operates when it receives a demanded state of the management PC 210 from the management PC 210 via the data communication section 201, to store the demanded state in the data storage section 203.

The data storage section 203 has a data table which stores the current state of the mobile terminal 20 and the demanded state of the management PC 210 in a tabular form.

The log storage section 204 stores terminal operation logs received from the mobile terminal 20.

Next, a description will be given of the data structure of the data table held in the data storage section 203.

FIG. 10 is a diagram showing an example of the data structure of the data table.

The data table 203a includes the columns of "Terminal ID", "Parameter", "Flag", "Requested Value" and "Current Value", and pieces of information arranged in each row in the respective columns are associated with each other.

In the column of "Terminal ID", there are set IDs each for uniquely identifying the associated mobile terminal 20.

In the column of "Parameter", there are set parameters for use in transmitting response data.

In the column of "Flag", there are set flags for causing the management data transmitted from the mobile terminal 20 to contain the reception confirming data, so as to determine whether or not the mobile terminal 20 has received the response data.

To request the mobile terminal 20 to cause the management data to contain the reception confirming data, the management server 200 sets the flag to 1, and upon reception of the reception confirming data from the mobile terminal 20, the management server 200 sets the flag to 0. Thus, it is possible to determine that data communication has been positively established between the management server 200 and the mobile terminal 20.

It should be noted that the reception confirming data is not particularly limited, insofar as it is data based on which the management server 200 can determine that the mobile terminal 20 has received the response data.

In the column of "Requested Value", there are set demanded states received from the management PC 210. In the illustrated example, either "Normal" (normal state) designating the state of the normal transmission, or "Urgent" (urgent state) designating the state of the forced transmission is set.

In the column of "Current Value", there is set a current state of the mobile terminal 20. In the illustrated example, either "Normal" indicating that the mobile terminal 20 is in the state of the normal transmission, or "Urgent" indicating that the mobile terminal 20 is in the state of the forced transmission is set.

Next, a description will be given of response data which is transmitted from the management server 200 to the mobile terminal 20 when the state of the mobile terminal 20 is changed from the state of the normal transmission to the state of the forced transmission.

Figure 11:
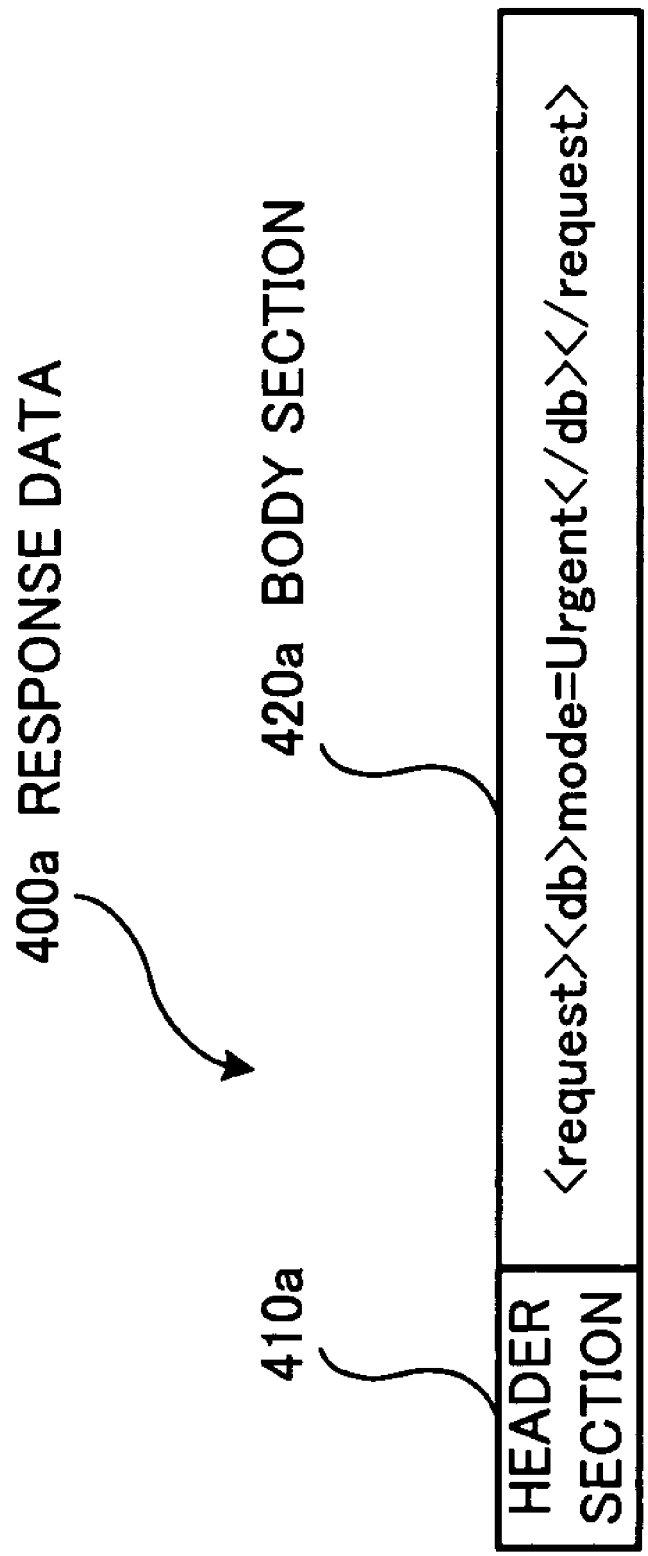
FIG. 11 is a diagram showing response data.

FIG. 11 is a diagram showing the response data.

The response data 400a is comprised of a header section 410a and a body section 420a.

In the body section 420a, a value (push value) which indicates that the requested value is "Urgent" is set in the HTML (HyperText Markup Language) format.

It should be noted that when there is no push value (when the flag is equal to 0), the body section 420a of the response data 400a is blank.

Further, although not shown, when the state of the mobile terminal 20 is changed from the state of the forced transmission to the state of the normal transmission, a value (push value) which indicates that the requested value is "Normal" is set in the HTML format.

Next, a description will be given of the operation of the management server 200 in the case where the state of the mobile terminal 20 is changed from the state of the normal transmission to the state of the forced transmission.

Figure 12:
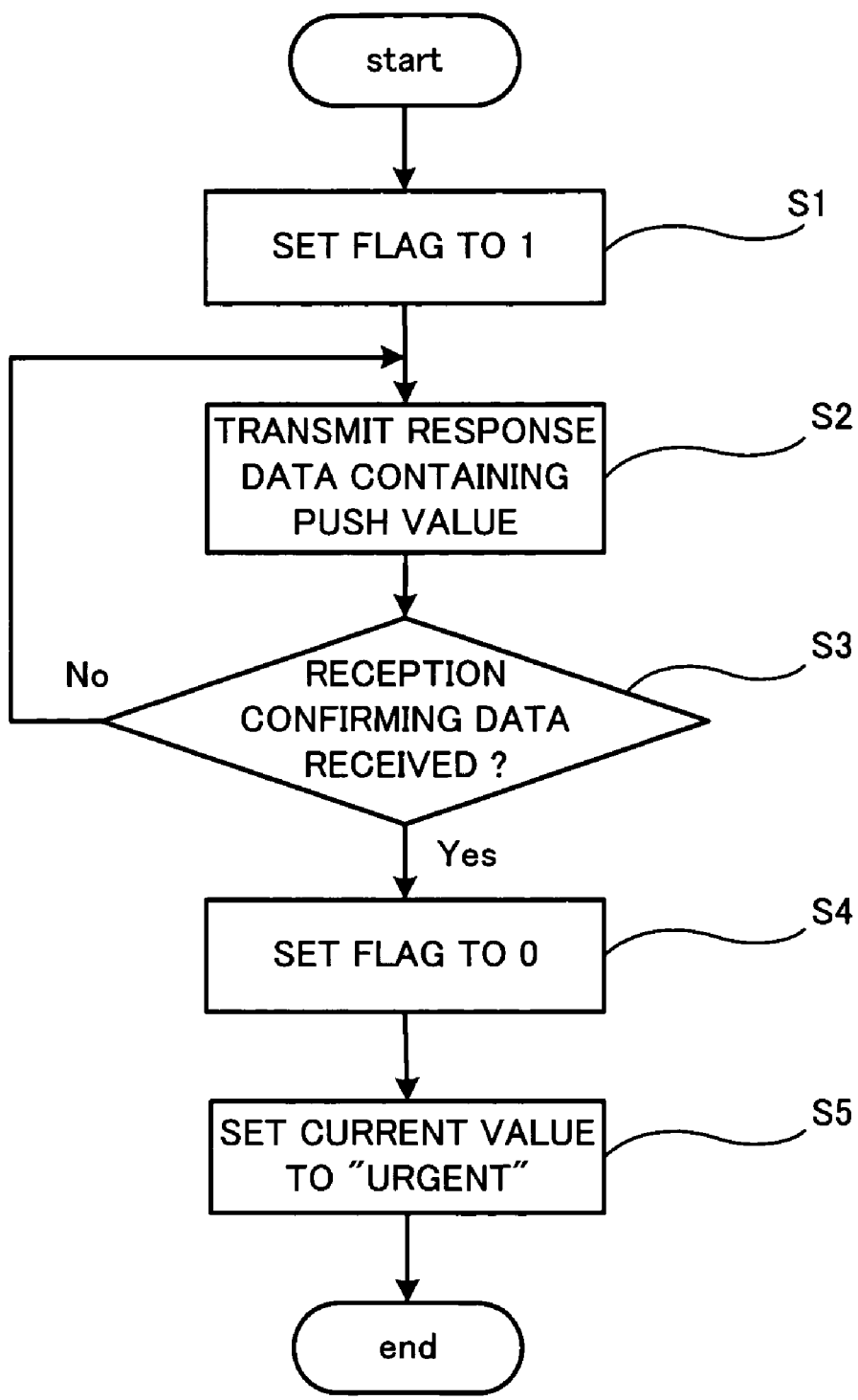
FIG. 12 is a flowchart showing the operation of the management server in the case where the mode of the mobile terminal is changed from a normal transmission mode to a forced transmission mode.

FIG. 12 is a flowchart showing the operation of the management server in the case where the state of the mobile terminal is changed from the state of the normal transmission to the state of the forced transmission.

First, the flag of the data table 203a is set to 1 (step S1).

Then, response data containing a push value designating the state of the forced transmission is transmitted to the mobile terminal 20 (step S2).

Then, it is determined whether or not the reception confirming data has been received from the mobile terminal 20 (step S3). If the reception confirming data has not been received (No to S3), the process proceeds to the step S2, wherein the operation of the management server 200 is continued. On the other hand, if the reception confirming data has been received (Yes to S3), the flag of the data table 203a is set to 0 (step S4).

After that, the current value of the data table 203a is set to "Urgent" (step S5).

This completes the present operation of the management server 200.

Although FIG. 12 illustrates the operation of the management server, for changing the state of the mobile terminal from the state of the normal transmission to the state of the forced transmission, to change the state of the mobile terminal from the state of the forced transmission to the state of the normal transmission, the flag of the data table 203a is similarly set to 1, and response data containing a push value designating the state of the normal transmission is transmitted to the mobile terminal 20. When the reception confirming data has been received from the mobile terminal 20, the flag of the data table 203a is set to 0, and the current value thereof is set to "Normal".

Next, a description will be given of the operation of the mobile terminal 20.

Figure 13:
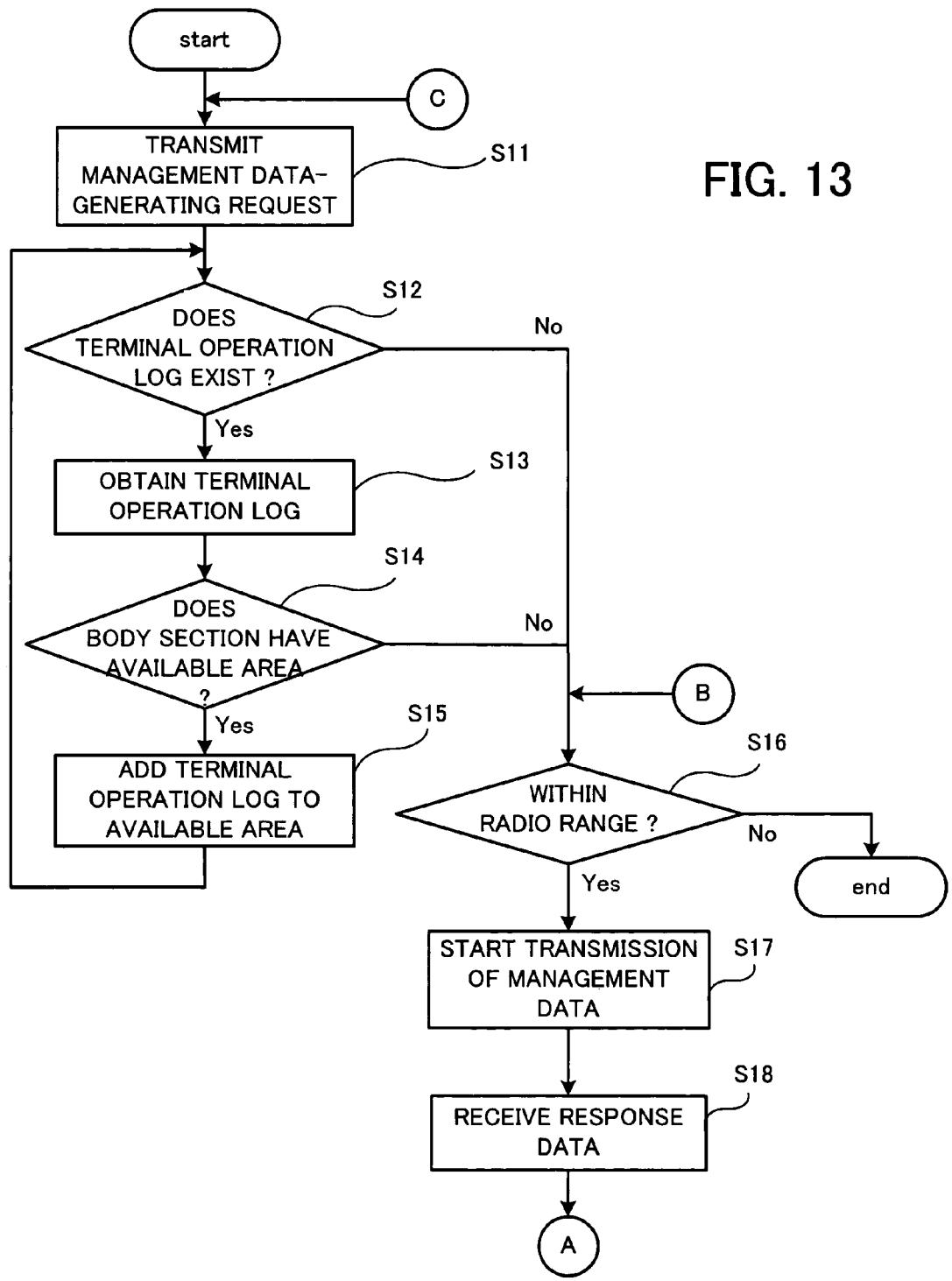
FIG. 13 is a flowchart showing the operation of the mobile terminal.
Figure 14:
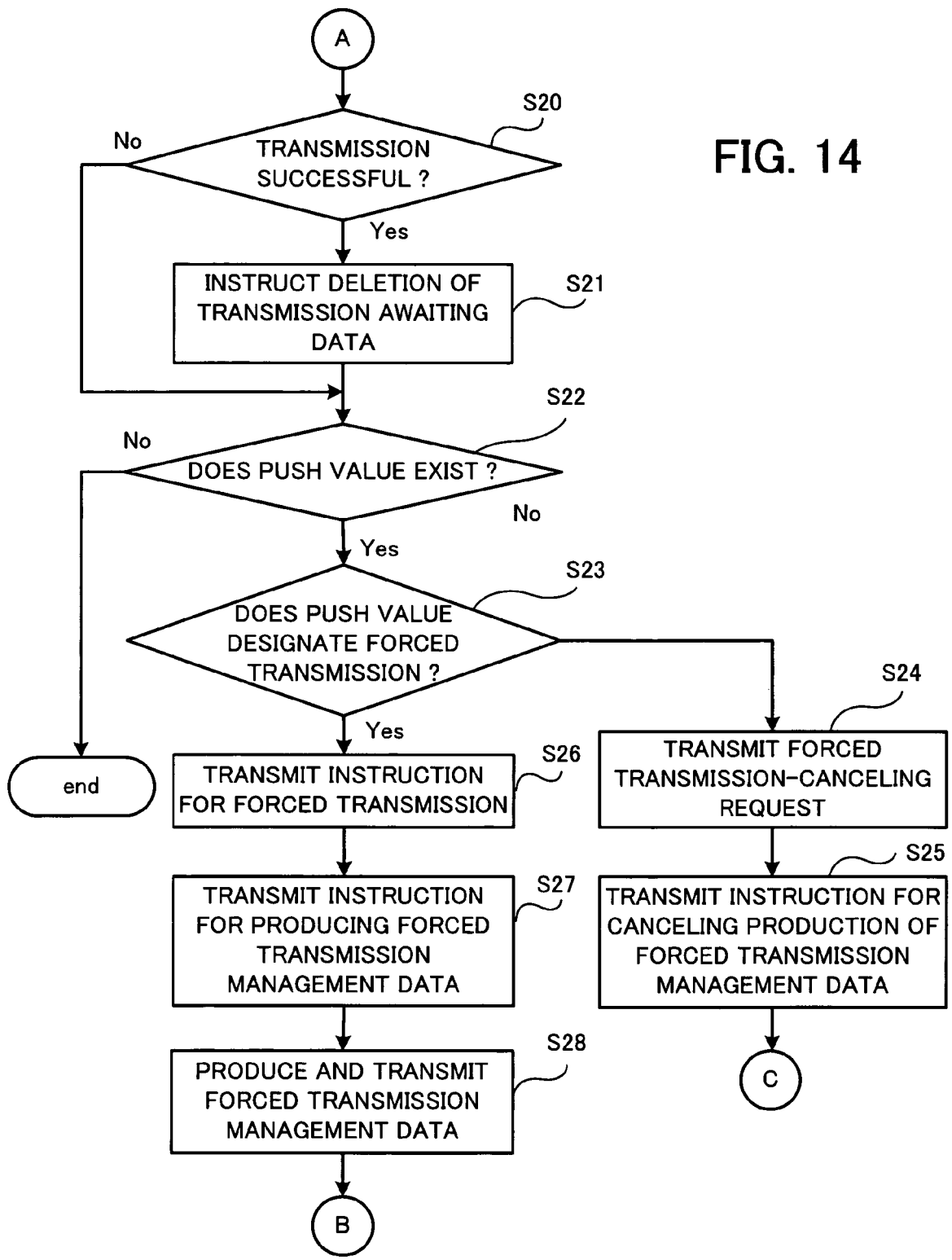
FIG. 14 is a flowchart showing the operation of the mobile terminal.

FIGS. 13 and 14 are flowcharts showing the operation of the mobile terminal 20.

First, the communication scheduler 36 transmits the management data-generating request to the management data-generating section 37 in the timing of polling communication (step S1).

Then, the management data-generating section 37 determines whether or not a terminal operation log exists (step S12). If a terminal operation log exists (Yes to S12), the management data-generating section 37 obtains the terminal operation log (step S13). Then, the management data-generating section 37 determines whether or not the body section of the management data has an available area, that is, whether or not the transmission size of the management data obtained by adding the obtained terminal operation log to the body section is smaller than the maximum transmission size (whether or not the transmission packet has an available area) (step S14). If the body section (management data) has an available area, (Yes to S14), the management data-generating section 37 adds the terminal operation log to the available area (step S15), followed by the process returning to the step S12, wherein the operation of the mobile terminal 20 is continued.

If there is no terminal operation log in the step S12 (No to S12), or if the body section (management data) has no available area in the step S14 (No to S14), the communication scheduler 36 determines whether or not the mobile terminal 20 is within the radio range, with reference to the results of determination of the inside radio range-determining section 35 (step S16).

If the mobile terminal 20 is not within the radio range (No to S16), the operation of the mobile terminal 20 is immediately terminated, and then the communication scheduler 36 transmits the management data-generating request to the management data-generating section 37 again in the timing of execution of the next polling communication (the present process proceeds to the step S11 to carry out the operation of the mobile terminal 20).

On the other hand, if the mobile terminal 20 is within the radio range (Yes to S16), the management data-communicating section 40 starts transmission of the management data (step S17).

The management data-communicating section 40 receives the response data (step S18).

Then, the received data-processing section 38 confirms whether or not the response data contains reception confirming data, whereby the mobile terminal 20 determines whether or not the transmission of the management data on the immediately preceding occasion (transmission in the step S17) was successfully performed (step S20). If the transmission of the management data was not successfully performed (No to S20), the present process proceeds to a step S22, whereas if the transmission of the management data was successfully performed (Yes to S20), the received data-processing section 38 deletes part of the terminal operation logs corresponding to the management data transmitted on the immediately preceding occasion, from the operation log-accumulating section 33 (step S21).

Next, the forced transmission-determining section 39 determines whether or not the response data contains a push value (step S22). If no push value is contained (No to S22), the operation is terminated, and the communication scheduler 36 transmits the management data-generating request to the management data-generating section 37 again in the timing of execution of the next polling communication (the present process proceeds to the step S11 to carry out the operation). If a push value is contained (Yes to S22), it is determined whether or not the push value designates the state of the forced transmission (step S23). If the push value does not designate the state of the forced transmission (No to S23), the forced transmission-determining section 39 sends the forced transmission-canceling request to the management data-communicating section 40 (step S24). The management data-communicating section 40 sends the instruction for canceling the production of the forced transmission management data to the management data-generating section 37 (step S25). The communication scheduler 36 transmits the management data-generating request to the management data-generating section 37 again in the timing of execution of the next polling communication (the present process proceeds to the step S11 to carry out the operation).

On the other hand, if the push value designates the state of the forced transmission (Yes to S23), the forced transmission-determining section 39 sends an instruction for executing the forced transmission to set all the remaining transmission awaiting data to transmission data, to the management data-communicating section 40 (step S26).

The management data-communicating section 40 sends the instruction for producing the forced transmission management data to the management data-generating section 37 (step S27).

The management data-generating section 37 produces the forced transmission management data, and sends the same to the management data-communicating section 40 (step S28). After that, the present process proceeds to the step S16 to continue the operation.

As described above, according to the data communication system of the present embodiment, management data containing terminal operation logs is transmitted to the management server 200 in a state in which the management data can be transmitted to the management server 200. More specifically, the data communication system of the present embodiment is configured to be capable of transmitting with the least waste a larger amount of data by a single transmission by making most of the range of the maximum transmission amount, such as the MTU, which is defined in advance for the transmission network and guaranteed to be transmitted at a time. This makes it possible to carry out data communication more efficiently than when individual data items are transmitted separately, and hence it is possible to shorten a time period required in transmitting the management data and quickly transmit operation logs (accumulation data). Further, it is possible to reduce transmission costs (a packet charge for transmission or the like) compared with the case where individual data items are transmitted separately.

Further, the communication scheduler 36 transmits a management data-generating request to the management data-generating section 37, and subsequently, when notified by the management data-generating section 37 that generation of management data has been completed, the communication scheduler 36 confirms whether the mobile terminal 20 is within the radio range with reference to the results of determination of the inside radio range-determining section 35. When it is confirmed that the mobile terminal 20 is within the radio range, the communication scheduler 36 transmits to the management data-communicating section 40 a transmission enable notification for enabling the management data-communicating section 40 to send data waiting for communication in the management data-communicating section 40 to the management server 200. Therefore, it is possible to transmit management data more quickly when the mobile terminal 20 enters the radio range from outside the same.

Further, the mobile terminal 20 is configured such that it can be placed both in the state of the normal transmission and in the state of the forced transmission, so that even if the mobile terminal 20 is lost, for example, data containing all the operation logs stored in the operation log-accumulating section 33 can be transmitted more quickly to the management server 200 as forced transmission management data by placing the lost mobile terminal 20 in the state of the forced transmission. This makes it possible to prevent data from being left behind in the mobile terminal 20 to thereby enhance the security of the system.

Although in the embodiment of the present invention, the description has been given of the example in which the mobile terminal 20 performs communication with the management server 200, this is not limitative, but the present invention is also applicable to communication performed by the mobile terminal 20 with the business operation server 100. In this case, it is preferable that the mobile terminal 20 is configured such that when the mobile terminal 20 receives a command for transmitting business operation data to the business operation server 100, by user's operation of the operating section 12, operations of the input processing section 32 and the business operation data-communicating section 34 are carried out in the background. This enables the user to switch screens after instructing the transmission and perform the next business operation without waiting for termination of execution of one business operation, and therefore it is possible to enhance operability and perform smooth business operations.

The preferred embodiment of the present invention has been described heretofore, but the present invention is by no means limited to the preferred embodiment. Although in the above-described embodiment, processing for increasing the amount of data transmitted at a time is carried out in the forced transmission, by way of example, this is not limitative, but processing for shortening time intervals of execution of the polling communication, or a combination of the above two types of processing may be carried out in the forced transmission.

It should be noted that the processing functions described above can be realized by a computer (by causing a computer to execute a predetermined data communication program). To this end, there is provided a program describing the details of processing of the functions which the mobile terminal should have. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory, for example. The magnetic recording device includes a hard disk drive (HDD), a flexible disk (FD), and a magnetic tape, for example. The optical disk includes a DVD (Digital Versatile Disk), a DVD-RAM (Random Access Memory), a CD-ROM (Compact Disk Read Only Memory), and a CD-R (Recordable)/RW (ReWritable), for example. Further, the magneto-optical recording medium includes an MO (Magneto-Optical disk), for example.

To make the program available on the market, portable recording media, such as DVD and CD-ROM, which store the program, are sold. Further, the program can be stored in a storage device of a server computer connected to a network, and transferred from the server computer to another computer via the network.

When the data communication program is executed by a computer, the program stored e.g. in a portable recording medium or transferred from the server computer is stored in a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

In the present invention, since transmission data transmitted to the server for inquiry is caused to contain accumulation data that should be uploaded, it is possible to transmit a larger amount of data by a single transmission. This makes it possible to shorten a time period required in data transmission compared with the case where the transmission data and the accumulation data are transmitted separately, thereby making it possible to transmit the accumulation data efficiently.

Further, it is possible to determine whether or not the transmission data can be transmitted to the server, and then start transmission of the transmission data immediately after the mobile terminal enters a state in which the transmission data can be transmitted. This makes it possible to transmit the accumulation data quickly.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable recording medium storing a data communication program causing a mobile terminal having computer capabilities to periodically perform communication for inquiring of a predetermined server as to whether or not there exists data of which the server should notify the mobile terminal, and for receiving a signal transmitted from the server in response to the inquiry, wherein the mobile terminal functions as:

data accumulating means for accumulating accumulation data to be uploaded to the server;

transmission data-generating means for causing transmission data for the inquiry that is to be transmitted to the server to contain the accumulation data;

determination means for determining whether or not the mobile terminal is in a state in which the transmission data can be transmitted to the server;

a communication scheduler for permitting the transmission data to be transmitted to the server based on a result of determination of said determination means; and data communication means for transmitting the transmission data to the server in response to permission of said communication scheduler;

wherein if a maximum data amount is defined for the transmission data, said transmission data-generating means determines whether or not an amount of the transmission data is smaller than the maximum data amount, and if the amount of the transmission data is smaller than the maximum data amount, said transmission data-generating means causes the transmission data to contain as much accumulation data as possible such that the transmission data does not exceed the maximum data amount, wherein the mobile terminal is caused to further function as a forced transmission-determining means for determining whether or not forced transmission to the server should be performed, based on a response from the server, and wherein in performing the forced transmission to the server, said transmission data-generating means is capable of generating the transmission data exceeding a maximum data amount defined for the transmission data.

2. The computer-readable recording medium according to claim 1, wherein in performing the forced transmission, said communication scheduler makes a time interval of periodical generation of the transmission data shorter than when the forced transmission is not performed.

3. The computer-readable recording medium according to claim 1, wherein the accumulation data comprises operation logs produced by user's operation of the mobile terminal.

4. The computer-readable recording medium according to claim 1, wherein the accumulation data is business operation data concerning business operations, produced by user's operation of the mobile terminal.

5. A method of data communication including periodically performing communication for inquiring of a predetermined server as to whether or not there exists data of which the server should notify a mobile terminal having computer capabilities, and receiving a signal transmitted from the server in response to the inquiry, by using the mobile terminal, comprising the steps of:

accumulating accumulation data to be uploaded to the server;

causing transmission data for the inquiry that is to be transmitted to the server to contain the accumulation data;

determining whether or not the mobile terminal is in a state in which the transmission data can be transmitted to the server; and transmitting the transmission data to the server when the transmission data can be transmitted to the server;

wherein if a maximum data amount is defined for the transmission data, the method determining whether or not an amount of the transmission data is smaller than the maximum data amount, and if the amount of the transmission data is smaller than the maximum data amount, the method causing the transmission data to contain as much accumulation data as possible such that the transmission data does not exceed the maximum data amount, wherein the method determines whether or not forced transmission to the server should be performed, based on a response from the server, and wherein in performing the forced transmission to the server, the method is capable of generating the transmission data exceeding a maximum data amount defined for the transmission data.

6. A mobile terminal that has computer functions, and periodically performs communication for inquiring of a predetermined server as to whether or not there exists data of which the server should notify the mobile terminal, and receives a signal transmitted from the server in response to the inquiry, comprising:

data accumulating means for accumulating accumulation data to be uploaded to the server;

transmission data-generating means for causing transmission data for the inquiry that is to be transmitted to the server to contain the accumulation data;

determination means for determining whether or not the mobile terminal is in a state in which the transmission data can be transmitted to the server;

a communication scheduler for permitting the transmission data to be transmitted to the server based on a result of determination of said determination means; and data communication means for transmitting the transmission data to the server in response to permission of said communication scheduler;

wherein if a maximum data amount is defined for the transmission data, said transmission data-generating means determines whether or not an amount of the transmission data is smaller than the maximum data amount, and if the amount of the transmission data is smaller than the maximum data amount, said transmission data-generating means causes the transmission data to contain as much accumulation data as possible such that the transmission data does not exceed the maximum data amount, wherein the mobile terminal is caused to further function as a forced transmission-determining means for determining whether or not forced transmission to the server should be performed, based on a response from the server, and wherein in performing the forced transmission to the server, said transmission data-generating means is capable of generating the transmission data exceeding a maximum data amount defined for the transmission data.

* * * * *